(12) United States Patent
Sutherland et al.

(10) Patent No.: US 11,556,289 B2
(45) Date of Patent: Jan. 17, 2023

(54) SUPPLY ATTACHMENTS FOR TRANSMITTING PRINT DEVICE INFORMATION DATA OF A PLURALITY OF PRINT DEVICES TO A DEVICE

(71) Applicant: Hewlett-Packard Development Company, L.P., Spring, TX (US)

(72) Inventors: Jesse Sutherland, Vancouver, WA (US); Wesley R. Schalk, Vancouver, WA (US); Kirk E. Porritt, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/286,580

(22) PCT Filed: Dec. 11, 2018

(86) PCT No.: PCT/US2018/064866
§ 371 (c)(1),
(2) Date: Apr. 19, 2021

(87) PCT Pub. No.: WO2020/122872
PCT Pub. Date: Jun. 18, 2020

(65) Prior Publication Data
US 2021/0389915 A1 Dec. 16, 2021

(51) Int. Cl.
*B41J 2/175* (2006.01)
*G06F 3/12* (2006.01)
*G03G 15/00* (2006.01)

(52) U.S. Cl.
CPC ........ *G06F 3/1229* (2013.01); *B41J 2/17523* (2013.01); *B41J 2/17546* (2013.01); *G06F 3/1219* (2013.01); *G06F 3/1236* (2013.01); *G06F 3/1285* (2013.01); *G03G 15/553* (2013.01); *G03G 15/556* (2013.01)

(58) Field of Classification Search
None
See application file for complete search history.

(56) References Cited

U.S. PATENT DOCUMENTS

| 7,831,156 B2 * | 11/2010 | Igarashi ................. G03G 15/55 399/24 |
| 8,782,202 B2 | 7/2014 | Shima |
| 2007/0019016 A1 | 1/2007 | Silverbrook et al. |
| 2008/0267642 A1 * | 10/2008 | Hadano ............. G03G 15/5079 399/27 |
| 2009/0040551 A1 | 2/2009 | Ohara |
| 2009/0141303 A1 | 6/2009 | Azuchi |

(Continued)

FOREIGN PATENT DOCUMENTS

| CN | 1486466 A | 3/2004 |
| CN | 102112960 A | 6/2011 |
| CN | 104903111 A | 9/2015 |

*Primary Examiner* — Haris Sabah
(74) *Attorney, Agent, or Firm* — Brooks, Cameron & Huebsch, PLLC (57) ABSTRACT

An example system may include a plurality of print devices, a supply attachment, and a device remote to the plurality of print devices. The plurality of print devices may receive the supply attachment. The device remote to the plurality of print devices may receive signals via the supply attachment that are indicative of print device information data from the plurality of print devices.

19 Claims, 3 Drawing Sheets

(56) References Cited

U.S. PATENT DOCUMENTS

| | | |
|---|---|---|
| 2010/0073718 A1 | 3/2010 | Toma |
| 2010/0271655 A1* | 10/2010 | Reitz .................... G06F 3/1235 |
| | | 358/1.15 |
| 2013/0278965 A1* | 10/2013 | Uno .................. H04N 1/32507 |
| | | 358/1.15 |
| 2014/0002537 A1 | 1/2014 | Thacker et al. |
| 2014/0270813 A1 | 9/2014 | Ignatchenko et al. |
| 2016/0148610 A1 | 5/2016 | Kennewick, Jr. et al. |
| 2016/0339727 A1* | 11/2016 | Danzuka .................. B41J 29/38 |
| 2017/0201635 A1 | 7/2017 | Takamoto |
| 2017/0235252 A1* | 8/2017 | Okuyama .......... G03G 15/0891 |
| | | 399/254 |
| 2017/0315472 A1 | 11/2017 | Jeran |
| 2018/0072064 A1 | 3/2018 | Kiyohara |
| 2018/0345703 A1 | 12/2018 | Osadchyy et al. |

* cited by examiner

SUPPLY ATTACHMENTS FOR TRANSMITTING PRINT DEVICE INFORMATION DATA OF A PLURALITY OF PRINT DEVICES TO A DEVICE

BACKGROUND

At times, service providers and device manufacturers may place print devices in customer premises under a service contract. At times, technicians may visit customer premises to check on print device status, perform repairs and/or upgrades, and replace consumable components (e.g., consumable print substances), by way of example.

BRIEF DESCRIPTION OF THE DRAWINGS

Various examples will be described below by referring to the following figures.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration.

DETAILED DESCRIPTION

Print devices may be used in a number of different situations. For example, in a shared office space, a bank of printers may be accessible to users and may be configured to receive print jobs from different user devices (e.g., personal computers, tablets, laptops, etc.). In such a context, print jobs may be outputted in exchange for payment. In a more traditional office environment, print devices may be spread out at different locations and may be accessible, such as through a layer of security (e.g., using card readers and other security-based pull print options). In these (and other) cases, large numbers of devices may be distributed across a single location in some implementations and across multiple locations in others. In other cases, rather than using print devices with replaceable supply components (e.g., ink cartridges, toner cartridges, etc.), some print devices may have an internal reservoir that may be refilled using a refill supply attachment. In one implementation a refill supply attachment may have an interface that corresponds to the interfaces of different print devices of different types and characteristics (e.g., different print speeds, different capacities, etc.). The term "universal" supply is used herein to refer to such supply attachments. As should be apparent, there are a number of contexts in which print devices may be deployed, and users may expect the print devices to operate consistently and reliably in these and other contexts. It is noted that while the specification uses examples comprising print devices (e.g., inkjet, laser, etc.) in an office setting, claimed subject matter may apply equally to other contexts including, but not limited to, 3D printers, large format printers, industrial printers, and the like.

Providing a positive experience for users of print devices may be facilitated through collection of information related to the print devices. Example information that could be used to improve user experience includes print device status information. Examples of print device status information include indications of whether the device is operational, whether components (e.g., scanner, finisher, etc.) are functioning properly, whether consumables are of a source and/or quality that will yield desired print quality (PQ), whether there are any indications that could suggest potential unexpected downtime (e.g., expired licenses), etc. In addition to print device status information, other information that could be used to improve user experience includes device operational characteristic information. Examples of device operational characteristic information may include whether the device operating within expected parameters (e.g., paper jam frequency within allowable range, is throughput achieving expected levels, is noise at acceptable levels, etc.), whether troubleshooting components (e.g., circuits, sensors, etc.) indicate any potential issues, etc. For conciseness, the term print device information data will be used to refer to information related to a print device, such as print device status information and print device operational characteristic information, that may be used to improve user experience.

It is noted that print device information data does not include information related to supplies, such as whether supplies are authentic or supply levels, by way of example. Nevertheless, there may be a desire to communicate such information.

Collecting print device information data and supply-related information may present challenges, such as for devices that are not connected to a public network, behind a firewall, etc.

Indeed, at times, some print devices may be connected and/or accessible via a public network. For example, some such print devices may be connected to the Internet (e.g., through a LAN). Through such connections, remote devices (e.g., remote server of a service provider) may be able to exchange information, such as print device information data. However, at other times, print devices may not be accessible via public network. For instance, some devices may be deliberately inaccessible for security reasons, among other things. For example, print devices at high security locations (e.g., government buildings, offices dealing with cutting edge R&D, etc.) may be hidden behind firewalls and/or otherwise unconnected to public networks. Due to such lack of (or reduced) connectivity, the act of collecting print device information (e.g., by a service provider) may be limited, such as to service technician visits. As used herein, the terms "connected" and "unconnected" print devices are used to refer to devices that are accessible by a remote device and are not accessible by a remote device, respectively.

There may be a desire, therefore, for an approach (e.g., a device, a system, or a method) to enable collecting and communicating print device information data and supply-related information even in cases in which print devices may not be accessed remotely, such as by a service provider or device manufacturer, by way of illustration.

One approach to collecting and communicating print device information data may include using a supply attachment (e.g., a refill supply or supply extraction attachment) to collect print device information data from unconnected print devices. The collected print device information data may be subsequently communicated, such as upon establishment of a connection between the supply attachment and a connected device. In the context of print devices with refillable reservoirs, for example, supply attachments may be connected to print devices to introduce and extract print substances. For example, a refill supply container may comprise enough print substance (e.g., 1 L, 2 L, 3 L, or more) to be used to refill multiple print devices. By way of further example, a print substance extraction mechanism may be capable of receiving enough print substance to extract print substance from multiple print devices (e.g., such as at the end of a contract term). As such, the supply attachment may be used to collect print device information data from multiple print devices and then that collected information may be subsequently communicated, such as upon connection of the supply attachment to a print device connected to a public network (e.g., the Internet). In another implementation, the supply attachment may be sent to the service provider or manufacturer, where the print device information data may be collected directly.

It is noted that as opposed to print devices with refillable reservoirs, in the context of print devices with consumable print cartridges (e.g., inkjet printers with replaceable ink cartridges, laser printers with replaceable developer units or toner cartridges, 3D printers with replaceable agent cartridges, etc.) there have been attempts in the past to record to the consumable print cartridges in some cases. For example, to protect against unauthorized refilling of print substances, some print devices have been capable of writing a non-erasable bit to a consumable print cartridge once the contained amount of print substance falls below a threshold. However, the proposed approach to communicating print device information data from unconnected printers is distinguishable. Indeed, rather than writing print substance information to a cartridge, writing print device information to a consumable print cartridge would not be desirable in the case of consumable print cartridges. First, it is uncommon to use a consumable print cartridge in multiple print devices. An example lifecycle for a consumable print cartridge could include: consumable print cartridges are installed, the consumable substance is exhausted, and the consumable print cartridge is discarded and replaced with a new cartridge. Thus, using a supply attachment to collect print device information using consumable print cartridges would be impracticable due to the sheer volume of cartridges that would have to be collected, etc. Indeed, in such a case, collection of print device information would mean collecting all consumed cartridges (or at a minimum, fetching information stored on each cartridge). This would introduce considerable expense to the process (e.g., tracking, shipping, storing, etc.). And missing cartridges would lead to holes in the dataset that could potentially reduce the utility of collected data.

Additionally, while print substances could be relatively frequently topped off in the context of a print device with a refillable reservoir, in contrast, consumable print cartridges would likely be replaced less frequently. As such, collected print device information would likely be stale by the time it is collected. For instance, collecting information related to operational status to predict potential service issues would be of little value if only collected every few months (or less frequently) as there is a likelihood that the issues would have already been resolved in an earlier service visit.

For the foregoing reasons (and others), supply attachments in the context of print devices with refillable reservoirs may lend themselves to being well-suited for the collection of print device information data, such as from unconnected print devices.

Figure 1:
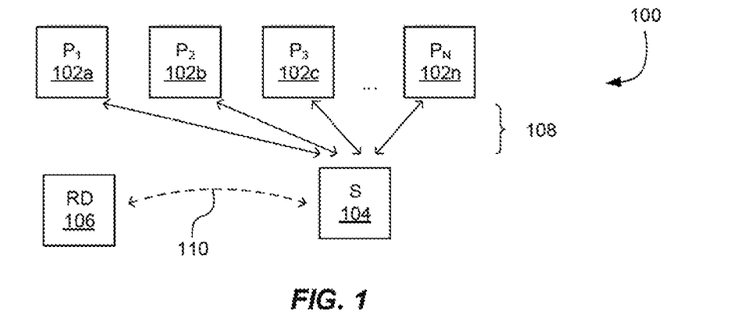
FIG. 1 is a block diagram illustration of an example system for collecting signals indicative of print device information.

FIG. 1 presents an example implementation of a supply attachment being used in a system of print devices with refillable reservoirs to collect print device information.

FIG. 1 is a block diagram of a system 100 comprising a number of print devices 102a-102n. A supply attachment 104 is also illustrated. Arrows 108 illustrate signals being exchanged between print devices 102a-102n and supply attachment 104 over a communications channel. A remote device 106 is shown and a broken arrow 110 illustrates signals being exchanged between supply attachment 104 and remote device 106 also over a communications channel.

Print devices 102a-102n refer to print devices, such as comprising internal reservoirs, and as may be deployed in a location or across a number of locations. Example print devices may include inkjet print devices having refillable internal reservoirs. Signals 108 transmitted to supply attachment 104 may include print device information data including (but not limited to), print device status information, print device operational characteristic information, and the like. As shall be discussed hereinafter, signals 108 may be transmitted to supply attachment 104 subsequent to attachment of supply attachment 104 to print devices 102a-102n. For instance, print devices 102a-102n may comprise different print device models with different characteristics, but that may nevertheless have a common interface for formation of a mechanical, electrical, and/or fluidic connection with supply attachment 104. Print device information data may be exchanged via this interface. And supply attachment 104 may be capable of storing received signals, such as in a computer-readable medium of supply attachment 104.

Supply attachment 104 may refers to a mechanism capable of connecting or attaching to print devices (e.g., print devices 102a-102n), exchanging signals with the print devices, and storing print device information data. In one implementation, supply attachment 104 may hold a volume of print substance, such as a marking agent or ink. The volume of print substance may be sufficient enough to enable supply attachment 104 to come into contact with multiple print devices (e.g., print devices 102a-102n). For example, supply attachment 104 may comprise 3 L of ink, and supply attachment 104 may come into contact with six or more print devices (e.g., providing approximately 500 ml of ink per device). In a top-off context in which minimal amounts of ink are provided to print devices (e.g., 5 ml, 10 ml, 50 ml, etc.) a single supply attachment 104 may come into contact with dozens of devices, if not more.

In another implementation, supply attachment 104 may comprise an extraction mechanism capable of storing print substance extracted from a print device with an internal reservoir (e.g., print device 102a). To illustrate, in the context of a service contract, print devices 102a-102n may be serviced and print substance replenished under an agreement between a service provider and a customer. As the contract reaches its end, there may be a desire on the part of the service provider to recuperate extra print substance in the reservoirs, such as to avoid a situation in which an end user is able to use a print substance provided under an expired contract to continue to print. Print substance extraction may be accomplished by attaching supply attachment 104, which may comprise an extracted print substance container (e.g., a bladder or similar mechanism) that may be of sufficient capacity to hold a volume of print substance extracted from a number of print devices. For instance, if supply attachment 104 is capable of holding 3 L of print substance and less than 3 L of print substance remains in reservoirs across a fleet of devices at a location, a single supply attachment 104 may be capable of collecting print device information data from the devices. There may be a desire to collect such information because even if the print devices are no longer under contract, there may nevertheless be an interest in providing information to the customer, such as regarding potential issues with the devices, as a service and/or to preserve a good relationship with the customer, without limitation.

Remote device 106 refers to a device, such as a computing device or server, located remotely from print devices 102a-102n. Remote device 106 may be located on a premise of a service provider, or may be accessible by a service provider. Remote device 106 may comprise a single device or a number of devices, such as in the context of a distributed computing environment (e.g., Hadoop), and may be a repository for storing and/or accessing print device information data.

A dotted arrow 110 is used to illustrate an exchange of signals between supply attachment 104 and remote device 106 because FIG. 1 does not attempt to constrain how the signals are exchanged. For example, in one case there may be an intermediary device (or multiple intermediary devices), such as illustrated in FIG. 2B. In another case, one of the print devices 102a-102n may comprise a connected print device with a connection to a public network and via which signals may be exchanged (e.g., FIG. 2A). In yet another example, signals may be exchanged between remote device 106 and supply attachment 104 through a direct (e.g., wired or wireless) connection between remote device 106 and supply attachment 104 (e.g., FIG. 2C). These examples are presented to illustrate possible implementations and are not intended to constrain the application of claimed subject matter.

Operation of system 100 is illustrated with reference to an implementation in which print devices 102a-102n comprise of inkjet-based print devices having internal reservoirs. In this case, a plurality of print devices (e.g., 102a-102n) may receive a supply attachment (e.g., supply attachment 104). The supply attachment may be a universal supply attachment. For example, supply attachment 104 may comprise a number of liters of ink and may connect to print devices 102a-102n in order to refill internal reservoirs thereof. In this case, print devices 102a-102n may be unconnected (e.g., behind a firewall and not accessible via a network connection to remote device 106). As such, supply attachment 104 may be used in order to collect signals indicative of print device information data from print devices 102a-102n. For instance, as supply attachment 104 is connected to print devices 102a-102n, print device information data such as print device status information and print device operational characteristic information may be received by supply attachment 104 and stored on a computer-readable medium thereof. In one case, the print device information data may include an identifier corresponding to print devices 102a-102n (e.g., to assist in identifying a source of print device information date).

Subsequently, remote device 106 may receive signals indicative of print device information data for print devices 102a-102n via supply attachment 104. As noted above, the transfer of signals indicative of print device information data from supply attachment 104 to remote device 106 may occur in a number of different ways, such as via a network connection and/or without direct human intervention (e.g., selection, collection, and/or transmission of data by a service technician).

By way of example, the received signals indicative of print device information data from the plurality of print devices may be received via a network connection.

Figure 2A:
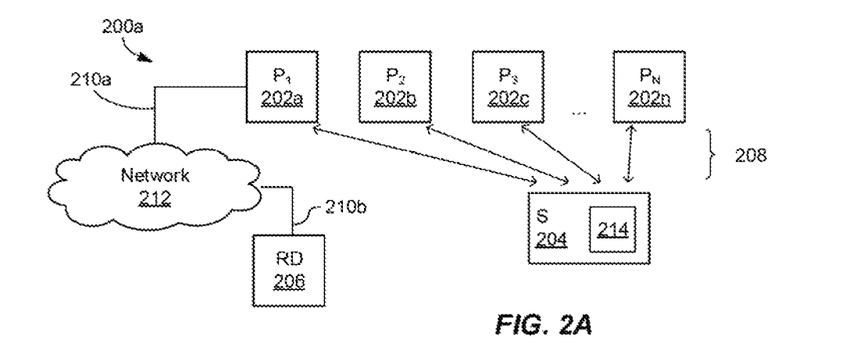
FIGS. 2A-2C are block diagrams illustrating other example systems for collecting signals indicative of print device information.
Figure 2B:
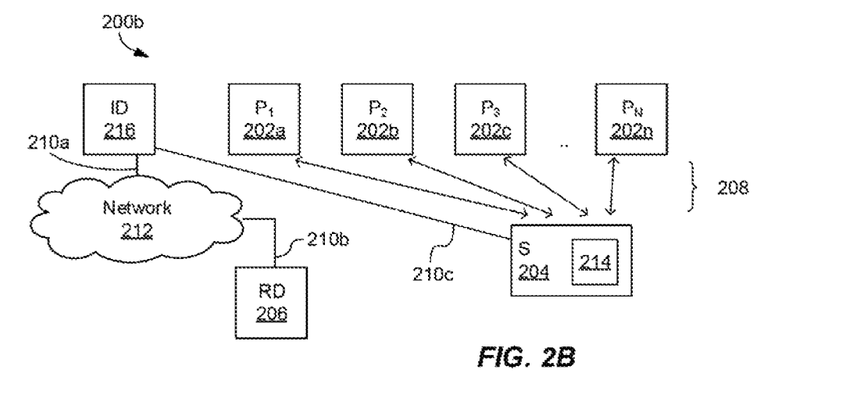

FIG. 2A illustrates an implementation of an example system 200a, which is similar to system 100, discussed above. System 200a includes a number of print devices 202a-202n (which may be similar to print devices 102a-102n), a supply attachment 204 (which may be similar to supply attachment 104), remote device 206 (which may be similar to remote device 106), and signals 208, 210a, and 210b (which may be similar to signals 108 and 110). However, in system 200a, print device 202a comprises a connected print device, as shown by signals 210a (e.g., transmitted over a communications channel). Print device 202a may be accessible via a network 212 by remote device 206 (e.g., via a communications channel as illustrated by 210b). Also, supply attachment 204 includes a computer-readable medium 214.

Example system 200a illustrates an implementation in which a portion of print devices (e.g., print devices 202b-202n) are unconnected and another portion of print devices (e.g., print device 202a) includes connected devices. For example, in a technology company, print devices located in an R&D department may be located behind a firewall and/or unconnected to a public network, while print devices in low security departments (e.g., consumer support) may be connected to a public network such as the Internet. In such a case, therefore, supply attachment 204 may be used to refill internal reservoirs of print devices 202b-202n, and then upon connection to a connected print device, print device 202a, print device information data from print devices 202b-202n in the form of signals may be transmitted via a communications channel, as illustrated by 210a. In one case, network 212 may comprise a private portion, such as a local area connection (LAN), and may subsequently connect to a public network, such as the Internet, via a port on the LAN. In another case, print device 202a may be directly connected to a public network via a communications channel, such as illustrated by 210a.

Returning to supply attachment 204 and collecting and storing print device information data on computer-readable medium 214, the stored data may be in the form of signals or states. For example, computer-readable medium 214 may comprise different forms of non-volatile and volatile memory in which stored signals and/or states may or may not be retained in the absence of power, respectively. Thus, computer-readable medium 214 may include random access memory (RAM), read-only memory (ROM), erasable programmable ROM (EPROM), electrically erasable programmable ROM (EEPROM), flash memory, phase change memory (PCM), and the like, without limitation.

In one implementation, a first print device (e.g., print device 202a) of a plurality of print devices (e.g., print devices 202b-202n) is connected to a device remote to the plurality of print devices (e.g., remote device 206) via a network (e.g., network 212) and a second print device of the plurality of print devices is unconnected (e.g., print device 202b), and further wherein the to be received signals are to be received via the network and are to comprise print device information data from the second print device.

FIG. 2B illustrates an implementation in which none of print devices 202a-202n are connected to a public network and/or otherwise visible to remote device 206. In this example system 200b, an intermediary device 216 may be used in order to transmit signals indicative of print device information data to remote device 206. Examples of intermediary device 216 may include a device (e.g., a print device, a computing device, etc.) residing at a different location. For example, in a case in which supply attachment 204 is used to refill an internal reservoir of print devices 202a-202n, which may not be connected to a public network, supply attachment 204 may be subsequently used on a print device at a different location (e.g., intermediary device 216), such as to refill an internal reservoir. Signals may be exchanged between supply attachment 204 and intermediary device 216, such as illustrated by 210c, and print device information data from print devices 202a-202n may be transmitted using a communication channel between intermediary device 216 and remote device 206 (e.g., as illustrated by 210a and 210b). In another case, intermediary device 216 may comprise a computing device, such as of a service provider, and that may be used to extract data, such as print device information data, from supply attachment 204.

For example, in one implementation, a supply attachment (e.g., supply attachment 204) may be used to collect print device information from unconnected print devices (e.g., print devices 202a-202n) and may store signals indicative thereof in a computer-readable medium (e.g., computer-readable medium 214) of supply attachment 204. An intermediary device (e.g., intermediary device 216) may receive signals from the supply attachment and facilitate transmission of the signals to a remote device (e.g., remote device 206).

Figure 2C:
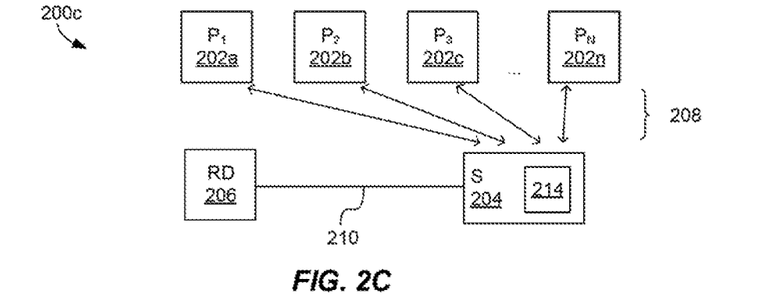

FIG. 2C illustrates another implementation, similar to FIGS. 2A and 2B in which an example system 200c enables a direct transfer, as illustrated by 210, of signals from supply attachment 204 to remote device 206. In this example, supply attachment 204 may be returned to a location at which remote device 206 is located, such as at a service provider facility, without limitation. For example, there may be environmental benefits to recycling supply attachments, and as such, in cases in which print devices (e.g., 202a-202n) are unconnected it may be possible to have the supply attachment 204 sent to a service provider for recycling at which time the service provider may extract stored print device information data.

Figure 3:
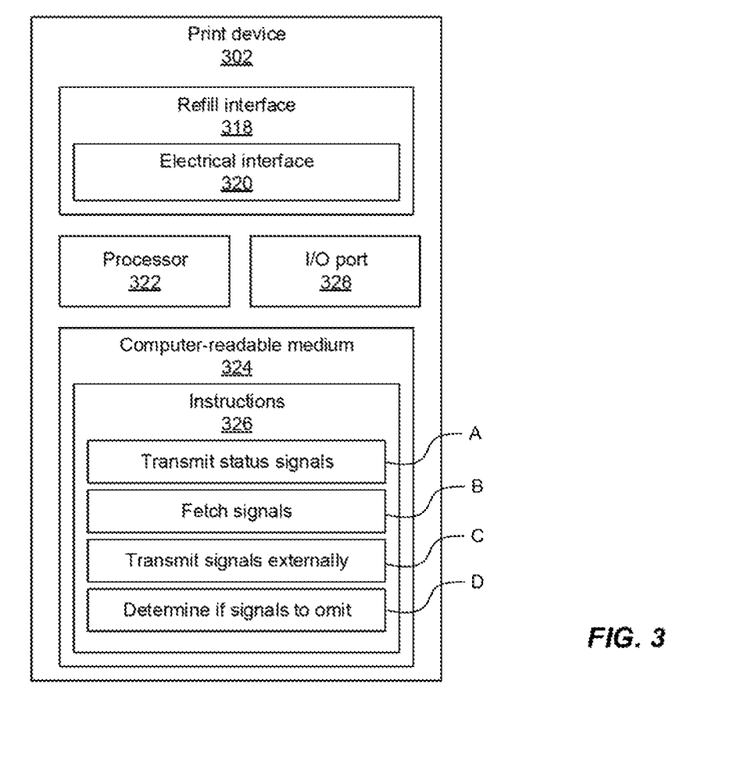
FIG. 3 is a schematic diagram of an example print device.

FIG. 3 is a block diagram illustrating example components of a print device 302, which may be similar to print devices 102a-102n and/or print devices 202a-202n. Example print device 302 has a refill interface 318 with an electrical interface 320, a processor 322, a computer-readable medium 324, and an I/O port 328. Instructions 326 may be stored on computer-readable medium 324, such as instructions to transmit status signals A, instructions to fetch signals B, instructions to transmit signals externally C, and/or instructions to determine if there are signals to omit D, by way of illustration but not limitation.

Refill interface 318 may be made up of structural (e.g., mechanical), electrical, and fluidic interface components. In this example, electrical interface 320 is the only of the possible interface components specifically called out, but it is to be understood that other interface components beyond electrical interface 320 may be included, without limitation. Electrical interface 320 may be used to form a communications channel with a corresponding interface on a supply attachment, such as supply attachment 204, to enable exchange of signals between print device 302 and the supply attachment.

As used herein, processor 322 refers to a physical component (e.g., not software per se), which may include a combination of hardware (e.g., circuitry, whether discrete or integrated) and software (e.g., software and/or firmware), capable of executing instructions and/or performing logical operations. Example processors may include general purpose processing units, graphical processing units, application-specific integrated circuits (ASICs), application-specific instruction set processors (ASIPs), field-programmable gate arrays (FPGAs), artificial intelligence (AI) accelerators or microprocessors, and the like.

Similar to as discussed above in relation to computer-readable medium 214, computer-readable medium 324 may include a number of different volatile and non-volatile forms of memory for storage of signals or states. In one case, computer-readable medium 324 may be capable of storing signals and/or states embodying processor-, machine-, or computer-executable instructions. For example, stored signals and/or states may be executed by processor 322 in order to exchange signals between a supply attachment (e.g., supply attachment 204) and print device 302, such as to store signals indicative of print device information from unconnected print devices.

It is noted that the following discussion includes reference to flowcharts, computer-readable media, and instructions. Implementation of flowchart methods and computer executable instructions may be performed using mechanisms such as processor 322 and computer-readable medium 324.

I/O port 328 refers to a combination of hardware and software to enable exchange of signals via a network connection, such as network 212, discussed above. For instance, in the case of a connected print device (e.g., print device 202a in FIG. 2A), signals indicative of print device information from unconnected print devices (e.g., print devices 202b-202n in FIG. 2A) may be received from a supply attachment and transmitted via I/O port 328. I/O port 328 may include (but not be limited to) hardware and software for a networking card (e.g., wired or wireless).

Thus, in operation, print device 302 may be capable of transmitting signals via an electrical interface (e.g., electrical interface 320) to a supply attachment (e.g., supply attachment 204). The transmitted signals may be indicative of print device information data and may include print device status information, print device operational characteristic information, or a combination thereof. Such transmission may be performed in response to execution of instructions, such as instructions to transmit status signals A.

An I/O port (e.g., I/O port 328) may be used to transmit and receive signals via a network (e.g., network 212). And in this case, processor 322 may execute instructions, such as instructions to fetch signals B from the supply attachment. As discussed, above, the fetched signals may be indicative of print device information data from other print devices (e.g., print devices 202b-202n). Instructions may also be executed by processor 322 in order to transmit signals externally C, such as to transmit the fetched signals via the I/O port and the network to a device remote to the print device (e.g., remote device 206).

In some cases, there may be a desire to protect or otherwise restrict data transmitted to remote device 206. This determination may be made at an unconnected device in which case the device may determine which of potential print device information to transmit to a supply attachment for storage. In another case, the omission of information may be determined prior to transmission via a network connection. Using the example of FIG. 3 merely by way of illustration, instructions may be executed by processor 322 in order to determine if there are signals to omit D. The determination may be made based on an agreement between a customer associated with the unconnected print devices and a service provider, based on whether or not the connected device is associated with the same customer, based on encryption available over the network, and other security- and privacy-related considerations.

Figure 4:
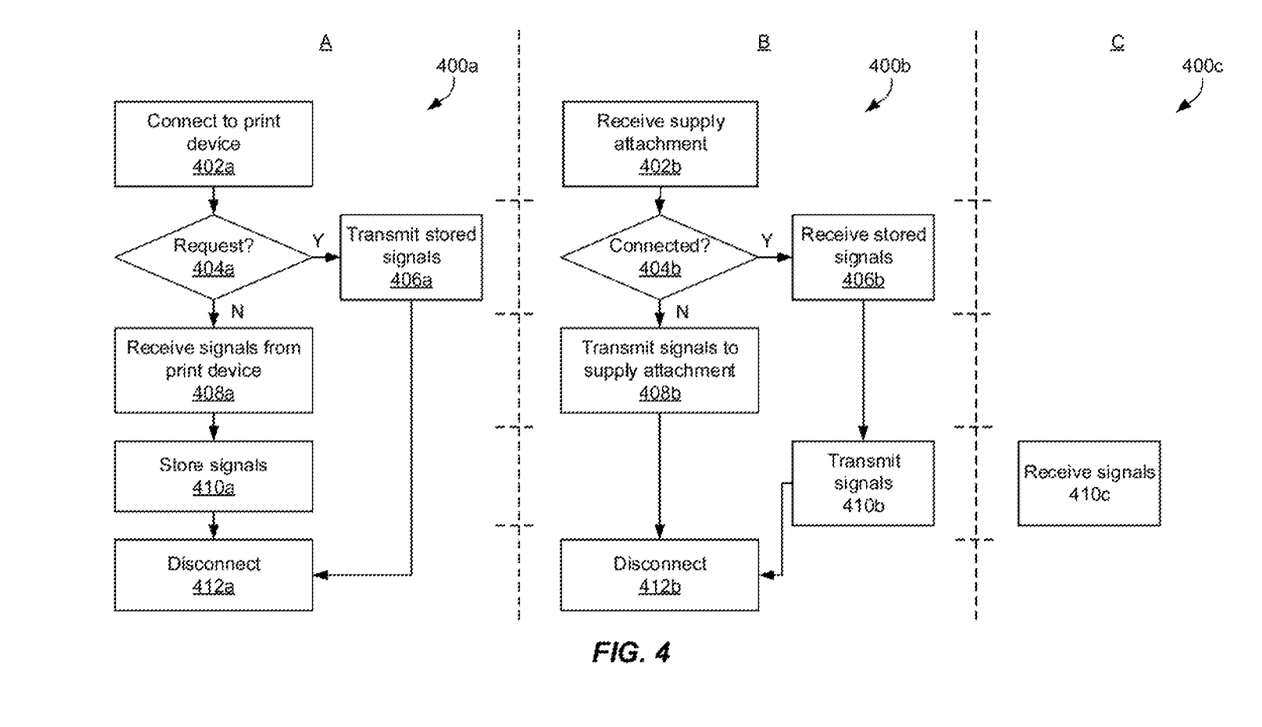
FIG. 4 is a flow diagram illustrating example methods of collecting, storing, and/or transmitting signals indicative of print device information.

FIG. 4 includes flow diagrams corresponding to example methods 400a, 400b, and 400c, for collection, transmission, and reception of signals indicative of print device information. In this illustration, method 400a corresponds to a process implementation from the perspective of a supply attachment, method 400b corresponds to a process implementation from the perspective of a print device, and method 400c corresponds to a process implementation from the perspective of a remote device. FIG. 4 illustrates an example in which corresponding blocks may occur in approximate chronological proximity, it is noted that this is merely an example of one potential case and is not to be taken in a limiting sense.

Starting first with method 400a, block 402a illustrates a connection between a supply attachment (e.g., 204) and a print device (e.g., print device 202a). By way of example, the supply attachment may include a refill supply container for refilling or topping off an internal reservoir of the print device.

At block 404a, a determination may be made, such as by a print device, as to whether or not to transmit stored signals indicative of print device information data, such as in response to a request from a print device (e.g., in response to a determination by the print device that it has a connection to a public network). If so, stored signals may be transmitted to the print device in response to the request, as shown at block 406a. The stored signals may be indicative of print device information data, potentially from a number of unconnected print devices. However, if the print device does not have a connection to a public network, the supply may be used to store print device information from the print device. Thus, as shown at block 408a, signals indicative of print device information data may be received by the supply attachment. And the signals may be stored, such as in a computer-readable medium (e.g., computer readable medium 324), as illustrated at block 410a. The supply attachment may be disconnected from the print device, as shown at block 412a.

Next, example method 400b illustrates reception of a supply attachment, as shown at block 402b. At block 404b, a determination may be made, such as in response to execution of instructions (e.g., instructions 326) by a processor (e.g., processor 322) as to whether a connection to a public network exists for the print device. In one case, the print device may normally have a connection to a public network, but the network connection may be nonfunctional while performing the determination at block 404b by way of example. In another case, and assuming a connection to a public network, signals may be received at the print device from the supply attachment, as shown at block 406b. Those received signals may correspond to print device information data from other print devices. The signals indicative of print device information data may be transmitted to a remote device, such as shown at block 410b.

If, on the other hand, the print device is not connected, then the print device may transmit its own print device information data to the connected supply, as shown at block 408b.

After transmission of signals, the supply attachment may be disconnected from the print device as shown at block 412b.

Next, moving to example method 400c, reception of signals indicative of print device information at a remote device (e.g., remote device 206) is illustrated at block 410c. The signals may be removed as illustrated in FIGS. 2A-2C, by way of example As such, in one implementation, a method of automatically collecting print device information from a plurality of print devices (e.g., print devices 202a-202n), may include receiving, from a connected device (e.g., print device 202a in FIG. 2A, intermediary device 216 in FIG. 2B, etc.), signals from a supply attachment (e.g., supply attachment 204) in response to connection of the supply attachment to the connected device. The signals received may be indicative of print device information from the plurality of print devices, which may be unconnected to a public network.

As should be apparent from the foregoing, in some cases, there may be a desire to use supply attachments to collect print device information from a number of print devices.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A system comprising:
a plurality of print devices to receive a refill supply attachment for refilling an internal reservoir of the plurality of print devices; and
a device remote to the plurality of print devices to receive signals via the refill supply attachment, the to-be signals received at the refill supply attachment from the plurality of print devices and indicative of print device information data from the plurality of print devices.

2. The system of claim 1, wherein the signals indicative of print device information data from the plurality of print devices are to-be received via a network connection.

3. The system of claim 1, wherein the refill supply attachment comprises a computer-readable medium to store the print device information data from the plurality of print devices.

4. The system of claim 3, wherein reception of the signals indicative of print device information data is to occur via a direct transfer between the refill supply attachment and the remote device.

5. The system of claim 3, wherein reception of the signals indicative of print device information is to occur via an intermediary device communicatively arranged between the refill supply attachment and the remote device.

6. The system of claim 1, wherein a first print device of the plurality of print devices is connected to the device remote to the plurality of print devices via a network and a second print device of the plurality of print devices is unconnected, and further wherein the signals are received via the network and comprise print device information data from the second print device.

7. The system of claim 1, wherein the refill supply attachment comprises a universal refill supply.

8. A print device comprising:
an I/O port to transmit and receive signals via a network;
a refill interface to receive a refill supply attachment, and
an electrical interface to enable exchange of signals with the refill supply attachment, the refill supply attachment for refilling an internal reservoir of the print device;
a processor; and
a computer-readable medium having executable instructions included thereon that upon execution by the processor are to:
transmit signals via the electrical interface to the refill supply attachment, the signals indicative of print device information data comprising print device status information, print device operational characteristic information, or a combination thereof;
fetch signals from the refill supply attachment, the signals indicative of print device information data from other print devices; and
transmit the fetched signals via the I/O port and the network to a device remote to the print device.

9. The print device of claim 8, wherein the executable instructions upon execution by the processor are further to:
determine whether the refill supply attachment comprises signals to omit for transmission via the I/O port.

10. The print device of claim 8, wherein transmission of the fetched signals is performed without human intervention.

11. The print device of claim 8, wherein the print device information data includes an identifier for the print device.

12. A method of automatically collecting print device information from a plurality of print devices, the method comprising:
receiving, from a connected device, signals from a refill supply attachment in response to connection of the refill supply attachment to the connected device, the signals indicative of print device information from the plurality of print devices, the plurality of print devices comprising print devices unconnected to a public network and the refill supply attachment for refilling an internal reservoir of the plurality of print devices.

13. The method of claim 12, wherein reception of signals from the refill supply attachment occurs without direct human intervention.

14. The method of claim 12, wherein the connected device comprises an Internet-connected print device.

15. The method of claim 12, wherein the signals are received at a device remote to the plurality of print devices and the connected device.

16. The method of claim 15, wherein the device remote to the plurality of print devices comprises a computing device of a service provider.

17. A method of automatically collecting print device information from a plurality of print devices that are unconnected to a remote device, the method comprising:
transmitting, via a refill supply attachment, signals indicative of print device information from the plurality of print devices, the print device information received by the refill supply attachment from the plurality of print devices, stored in a readable medium of the refill supply attachment, and transmitted from the refill supply attachment to the remote device.

18. The method of claim 17, wherein an intermediary device is communicatively coupled between the refill supply attachment and the remote device.

19. The method of claim 17, further comprising:
responsive to connection of the refill supply attachment to a print device of the plurality of print devices, receiving and storing in the refill supply attachment the signals indicative of print device information from the print device of the plurality of print devices,
wherein the transmitting the signals indicative of print device information further comprises, responsive to determination that the refill supply attachment is connected to a connected device, transmitting the signals indicative of print device information via the connected device.

* * * * *